F. A. BOEDTCHER.
ELEVATOR INDICATOR SYSTEM.
APPLICATION FILED FEB. 21, 1914.

1,165,383.

Patented Dec. 28, 1915.
5 SHEETS—SHEET 1.

WITNESSES
William P. Goebel.
A. L. Kitchin

INVENTOR
Franz A. Boedtcher
BY
ATTORNEYS

F. A. BOEDTCHER.
ELEVATOR INDICATOR SYSTEM.
APPLICATION FILED FEB. 21, 1914.

1,165,383.

Patented Dec. 28, 1915.
5 SHEETS—SHEET 5.

UNITED STATES PATENT OFFICE.

FRANZ A. BOEDTCHER, OF BERGENFIELD, NEW JERSEY.

ELEVATOR-INDICATOR SYSTEM.

1,165,383. Specification of Letters Patent. Patented Dec. 28, 1915.

Application filed February 21, 1914. Serial No. 820,188.

*To all whom it may concern:*

Be it known that I, FRANZ A. BOEDTCHER, a citizen of the United States, and a resident of Bergenfield, in the county of Bergen and State of New Jersey, have invented a new and Improved Elevator-Indicator System, of which the following is a full, clear, and exact description.

This invention relates to improvements in elevator indicators and systems of control therefor, and has for an object to provide an improved structure for causing the indicator at various floors to exhibit information showing the position and direction of travel of the elevator.

Another object of the invention is to provide a controlling device for an indicator whereby the indicator will always correctly show the position of the elevator and the direction of travel thereof.

A further object of the invention is to provide means associated with the indicator controlling device for permitting movement of the hoisting drum for the elevator without deranging the indicator.

A still further object of the invention is to provide an improved arrangement of wiring, push button attachments and annunciators arranged in the elevator, and at convenient points for showing or indicating the rings or signals of passengers on the various floors, and the corresponding actions of the elevators as the same take on said passengers.

In carrying out the objects of the invention the construction is adapted to be connected with any desired kind of elevator, and to elevators moving at any desired speed, and any desired distance. Arranged at the upper drum is an attachment for connecting the shaft of the drum with the cable or rod used in shifting the indicator needle at the respective floors of the building in which the elevator is arranged. This attachment is provided with an adjusting take-up, and with means for giving a direct pull on the cable rod which operates the various indicators. In addition to these devices, a power device is provided adjacent the drum which is arranged with a stop, and with friction members, whereby when the elevator reaches its uppermost position the indicator moving rod will be stopped even though the elevator move a short distance above its highest stop, or the drum rotates for a short distance beyond its ordinary stopping point. Connected with the indicator rod is an indicator for each floor which operates as the elevator moves up and down. Associated with the indicator rod and the indicators are annunciators and suitable wiring therefor, the annunciators being arranged in the elevators, and at any other convenient point, as for instance in the superintendent's office. In connection with the indicators a special drop is provided which is raised to indicate a signal when any of the buttons are pushed. These drops are held in position until the elevator comes to a stop at the floor on which the operated button is disclosed, whereupon a circuit is established for releasing the drop. Associated with the drop and the means for releasing the same is a drop regulating structure arranged preferably at the top of the elevator shaft. This regulating device is adapted to open the circuit of the releasing member for the drop while the elevator is moving at its usual speed so that when the elevator is moving at its usual speed so that when the elevator moves past a floor at its usual speed the drop will not be restored, whereby the next elevator will know that a passenger is still waiting to be transported from one floor to the other. In this way when a passenger closes the switch by pushing the button at any floor he is sure that the signal will be maintained in the various elevators until some of the same have stopped for him.

In the accompanying drawings

Figure 1:
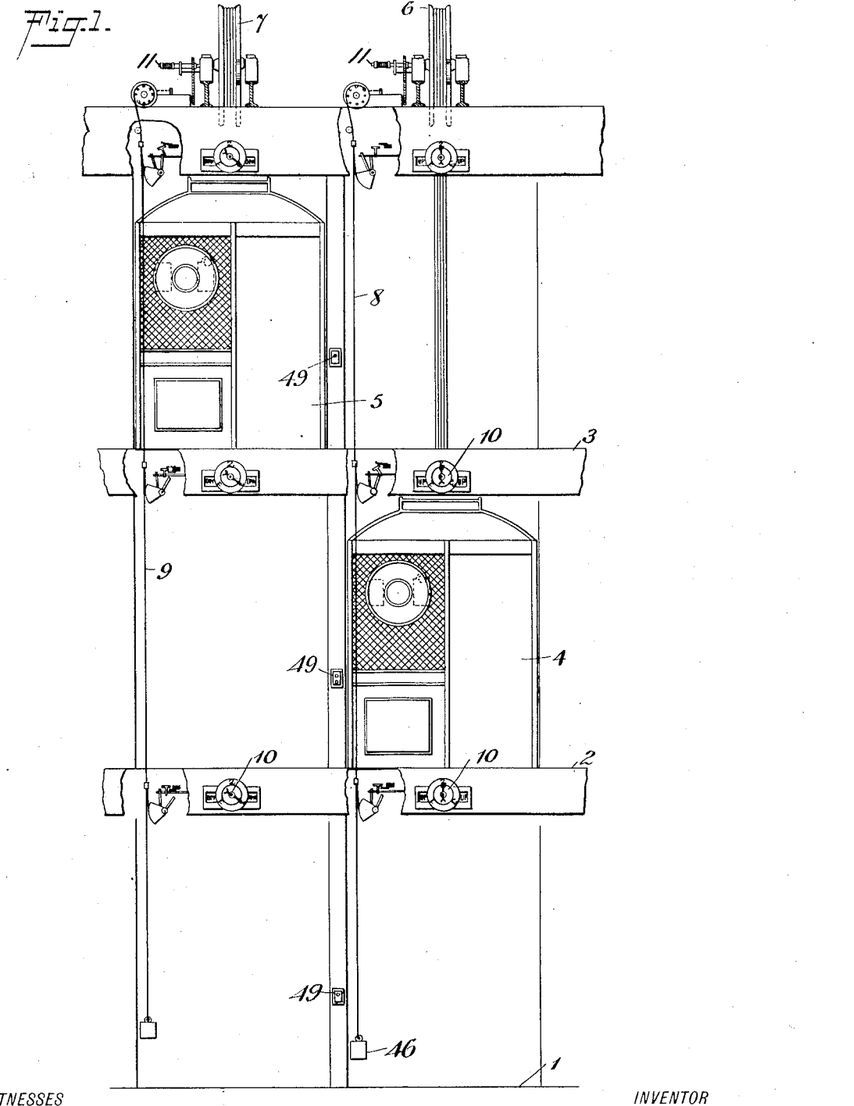
—Figure 1 is a front view of a pair of elevators and elevator shafts, together with associated parts, the same disclosing an embodiment of the invention.

Referring to the accompanying drawings by numeral, 1, 2 and 3 indicate the floors of a building in which elevators 4 and 5 are arranged. These elevators may be of any desired construction, and may be operated by any desired means, as for instance the usual cables and drums 6 and 7. The drums 6 and 7 are connected with the indicator rods or cables 8 and 9, and are designed to operate the same so that the various indicators 10 may continually show the position of the respective elevators 4 and 5. The means for operating the rods 8 and 9 are the same for each elevator, and these means are shown in detail in Figs. 15 and 16. Referring to these figures it will be observed that shaft 11 is secured to the shaft of drum 6 by being threaded therein and held in place by a suitable lock nut 12, which lock nut carries a bearing washer 13 against which bears sprocket wheel 14 and the end of the threaded sleeve 15. The sprocket wheel 14 is rigidly secured to sleeve 15 in any desired manner, as for instance by being keyed thereto. Sleeve 15 is threaded on the exterior and carries stops 16 and 17, which stops may be secured at any desired point along sleeve 15 rigidly to the sleeve by any desired clamping means, as for instance a set screw, or by being split at one point and squeezed against the sleeve by a suitable bolt 18. Each of these stops is provided with a tooth or projection 19 adapted to engage the respective teeth 20 and 21 on an arm 22 threaded on to sleeve 15. The arm 22 is provided with an aperture 23 through which a pin 24 extends, pin 24 being rigidly secured to the supporting bearing 25. When sleeve 15 rotates arm 22 is held stationary and consequently moves from one end to the other of the sleeve according to the direction of rotation of the sleeve. When arm 22 is at one end of the sleeve tooth 21 engages projection or tooth 19 on stop 16 and prevents the further rotation of sleeve 15. If the sleeve 15 is reversed arm 22 will move to the opposite end of said sleeve and tooth 20 will interlock with tooth 19 of stop 17, whereby any further movement of sleeve 15 will be presented. In this manner the number of revolutions of sleeve 15 is controlled, notwithstanding the greater amount of rotation of the shaft 11. Shaft 11 is rigidly connected with the shaft of drum 6, and continually rotates therewith. Arranged on the outer end of shaft 11 is a spring 26 which presses against the friction washer 27 and an adjustable stop 28 locked in place by a suitable set screw 29. By the arrangement of the stop 28, spring 26 may be brought under any desired tension, and consequently will press against sleeve 15 to any desired extent so as to give the necessary power to sleeve 15 to rotate sprocket wheel 14, and move the parts, hereinafter fully described, for properly actuating the rod or cable 8. This particular structure of sleeve 15 and associated parts, and the way the same is propelled, is very desirable, as oftentimes the drum 6 will move past the correct stopping point which would cause an additional movement of the indicator rod 8 unless the slipping feature just described in respect to sleeve 15 was present. Mounted on sprocket wheel 14 is a chain 30 which drives a sprocket wheel 31 rigidly secured to the end of a worm 32, which worm carries a traveling nut 33. The worm 32 is mounted in a suitable support 34, the sides of which act as a guide for plate 35, plate 35 being moved in one direction by the end of nut 33 and in the opposite direction by the feet or extensions 36 and 37 of the saddle or yoke 38. The saddle or yoke 38 partially surrounds nut 33 and travels on the opposite side of plate 35 to the nut 33. Chain 39 is connected with the yoke 38 and extends over a suitable guiding sprocket wheel 40, which sprocket is rigidly secured to shaft 41. Shaft 41 has rigidly connected therewith a tension and adjusting plate 42. The tension or adjusting plate 42 is provided with a plurality of radial slots 43 in which are arranged adjustable pins 44, which pins may be clamped in place in any desired manner, as for instance by having one end reduced and threaded, which end extends through the respective slots so as to receive a clamping nut on the opposite side. A chain or cable 45 is connected to one of the pins 44 and is looped over all or part of the remaining pins, and the end opposite that secured to one of the pins 44 is connected with the rod or cable 8. It will be evident that the pins 44 could be adjusted toward and from the center of plate 42 so as to give the rod or cable 8 a greater or less travel upon a single rotation of plate 42 so that the entire construction could be easily used upon a low building or a high building. The chain or cable 45 and the means for operating the same raise the cable 8, while a suitable weight 46 secured to the lower end of the cable or rod 8 acts under the law of gravitation for lowering the cable when plate 42 moves in a reverse direction. In order that the chain or cable 45 may act in a smooth, easy manner suitable rollers 44' may be arranged upon the pins 44. By the construction and arrangement thus described, means are presented which will cause the indicator cable or rod to always move the same distance so that the indicator pointers and other indicating means will always be actuated the same distance. The slipping of the upper or the lower drums or any of the various parts by reason of a sudden stop of the elevator will not in any way affect the proper movement of the indicator cable or rod and the various indicators connected therewith.

Figure 2:
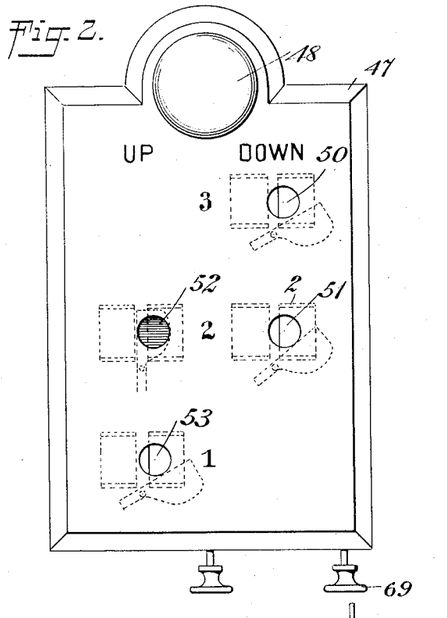
Fig. 2 is a front view of the annunciator arranged in the respective elevators.
Figure 3:
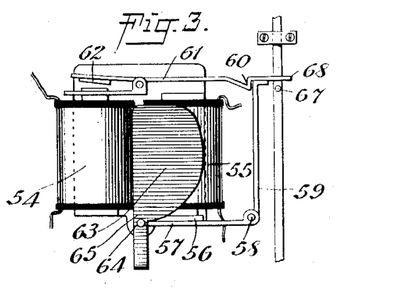
Fig. 3 is a fragmentary front view of the drop used in the annunciator shown in Fig. 2.
Figure 4:
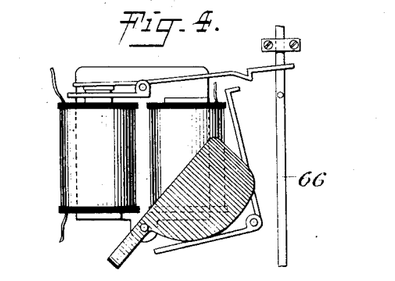
Fig. 4 is a view similar to Fig. 3, but disclosing the drop in a released or neutral position.

Arranged in each of the cars is an annunciator 47 which is provided with any desired kind of housing and a bell 48 adapted to be rung each time any of the buttons 49 are pressed, there being one or more buttons 49 on each floor. Arranged in the housing of the annunciator are apertures 50, 51, 52 and 53 back of which electrically operated drops are provided. These drops are more clearly shown in Figs. 3 and 4, wherein it will be observed that each drop is provided with electrical magnets 54 and 55. These magnets are connected with different circuits, magnet 55 being energized when any of the buttons 49 are pressed, while magnet 54 is energized when the elevator passes the floor carrying the button which has been pressed for energizing magnet 55. The circuits of magnets 54 and 55 will be hereinafter fully described so as to show how these magnets are energized as stated. When magnet 55 is energized the same attracts the armature 56 which is connected with a plate 57 pivoted at 58. Plate 57 has an upstanding arm 59 adapted to co-act with the stop 60 upon the pivotally mounted bar 61. The pivotally mounted bar 61 carries an armature 62 adapted to be attracted when the magnet 54 is energized. Arranged adjacent the magnets 54 and 55 is a shutter 63 pivoted at 64. The plate 57 engages the shutter 63 at point 65 for raising the same to the position shown in Fig. 3 when armature 56 is energized. When armature 56 is energized the arm 59 will be moved to the position shown in Fig. 3 and locked in that position by the stop 60. This is necessary as the depression or closing of the switch by pressing buttons 49 is only temporary, and consequently the magnet 55 is energized temporarily. However, it is desired to hold the shutter 63 in the position shown in Fig. 3 for some time, or until the passenger has been received so that the stop 60 co-acting with arm 59 is necessary to hold the shutter as shown in Fig. 3. When the car passes the floor on which the button is positioned the same closes the circuit of magnet 54, as hereinafter fully described, so that armature 62 is energized and stop 60 raised, whereupon the weight of armature 56 will cause plate 57 to drop down to the position shown in Fig. 4 under the action of gravity. This will also permit the shutter 63 to drop down to the position shown in Fig. 4 under the action of gravity, shutter 63 being continually overbalanced by the fact that the pivotal member 64 is not arranged centrally. In order that the shutter 63 may be allowed to move to an inoperative position, at any time, (Fig. 4,) a manually operated reciprocating rod 66 is provided which is formed with a stop or projection 67 adapted to engage the extension 68 of stop 60, whereby when the operator or any one presses the knob 69 on the lower end of rod 66 the stop will be raised and the shutter released. The magnets 54 and 55 of the various cars are arranged in multiple so that when any of the buttons 49 are pressed the annunciators of the various cars will show that fact, and will maintain the shutter 63 in its upright or operative position until one of the elevators has stopped for the passenger, whereupon all of the shutters 63 for that particular floor will drop down to the position shown in Fig. 4.

Figure 11:
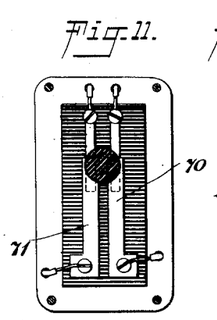
Fig. 11 is a plan view of a passenger operated switch, the casing thereof being removed.
Figure 12:
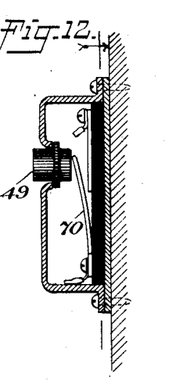
Fig. 12 is a longitudinal vertical section through the switch shown in Fig. 11.

In Figs. 11 and 12 will be seen the particular structure of push buttons 49. As shown in these figures the various push buttons 49 are provided with two sets of contact members 70 and 71, whereby when a button is depressed two circuits are closed, one circuit being connected with bell 48, and one circuit being connected with magnet 55, that is, these respective circuits are connected so the bell and magnets in all of the cars will operate upon the pressing of a single button 49. These circuits are clearly shown in Fig. 14, and will be fully described hereinafter.

Figure 8:
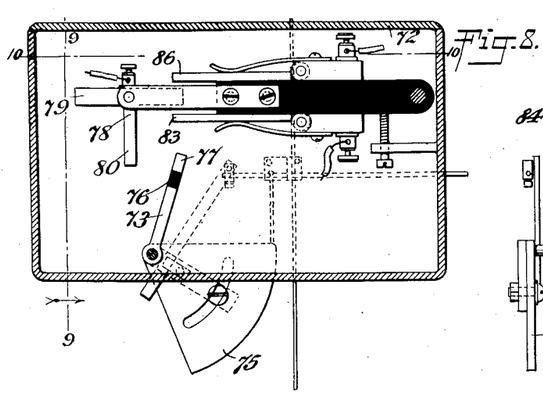
Fig. 8 is an edge view of a switch embodying certain features of the invention, the housing being shown in section.
Figure 9:
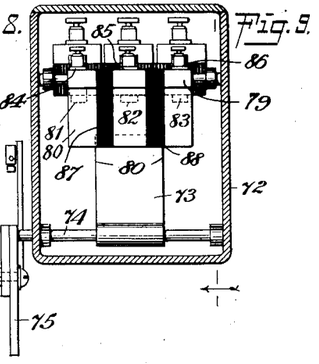
Fig. 9 is a sectional view through Fig. 8 approximately on line 9—9.
Figure 10:
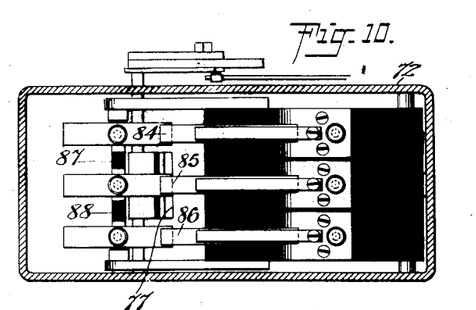
Fig. 10 is a sectional view through Fig. 8 approximately on line 10—10.

Figs. 8 to 10, inclusive, show a floor elevator-operated switch which is inserted in the circuit of the various magnets 54. A housing 72 is positioned adjacent the segmental member 75 associated with the indicator mechanism disclosed more particularly in Figs. 5, 6 and 7 hereinafter fully described. As shown in Fig. 8 arm 73 is provided with an insulating block or section 76 so that the contact end 77 is insulated from housing 72 and associated parts. As the elevators move up and down the segmental member 75 moves correspondingly, and consequently arm 73 moves or swings back and forth so as to rock member 78. Member 78 is formed with a transverse bar 79 and a depending operating bar 80 which is engaged by contact member 77 and moved one way or the other. When the contact member 77 is moved to the left, as shown in Fig. 8, the cross bar 79 will contact with the switches 81, 82 and 83, and when member 78 is swung in the opposite direction the bar 79 will contact with switches 84, 85 and 86. As shown in Fig. 10 the bar 79 is divided up into sections so that the individual sections engage the various switches or continually act simultaneously, as if they were one bar. As shown in Figs. 9 and 10, the operating bar 80 is divided into sections by insulating blocks 87 and 88. The various wires and the various circuits used are connected to these switches through suitable binding posts.

Figure 13:
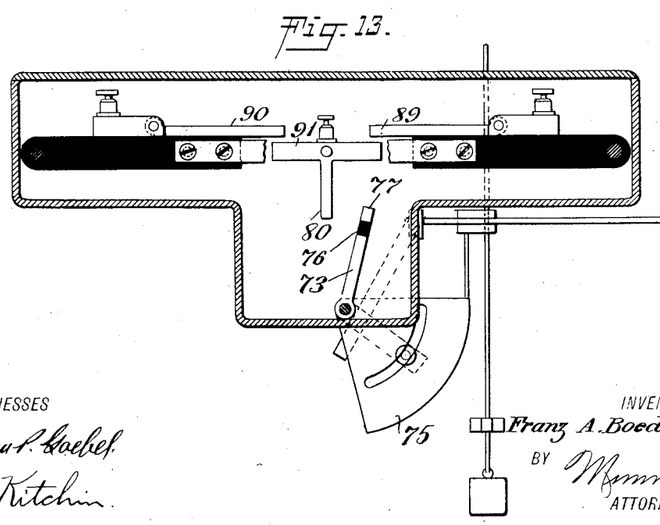
Fig. 13 is a longitudinal vertical section through an elevator operated switch, the same being a modified form of the switch shown in Fig. 8.

In Fig. 13 a slightly modified form of switch is shown to that disclosed in Figs. 8, 9 and 10. In this form of the invention there is no lower switch members, but the various switches 89 and 90 are arranged on the same plane, and the opposite ends of the horizontal bar 91 are adapted to operate these switches. It is to be understood that bar 91 is divided into sections, as shown in Fig. 10, and the various other structures shown in this form of the invention are similar to the form of the invention shown in Fig. 10 so that no additional description will be necessary.

Figures 5, 6, 7:
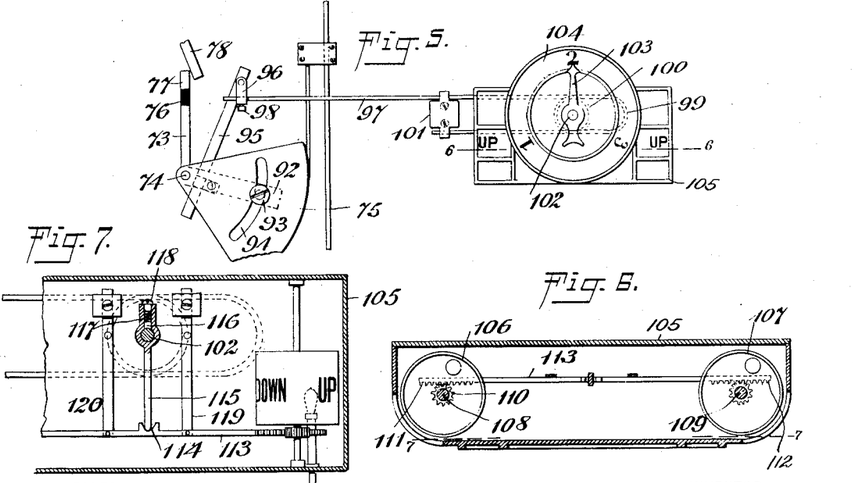
Fig. 5 is a front view of the indicator and associated operating parts.
Fig. 6 is a section through Fig. 5 approximately on line 6—6, the same being shown on an enlarged scale.
Fig. 7 is a fragmentary sectional view of the indicator, the same being taken approximately on line 7—7 of Fig. 6.

Referring to Figs. 5, 6 and 7 it will be observed that the same show an indicator mechanism associated with a segmental member 75, which member is connected with a pivotally mounted shaft 74, which shaft is supported by housing 72. A bar 92 is adjustably secured to segmental member 75 by a clamping screw 93. A suitable slot 94 is provided in segmental member 75 for permitting a proper arrangement of bar 92, which bar is journaled on shaft 74 and has clamped thereto an arm 95, which arm carries a swinging member 96. Rigidly clamped to swinging member 96 is a reciprocating rod 97. Rod 97 is preferably clamped to swinging member 96 by a set screw 98 so that rod 97 and swinging member 96 may be adjusted in respect to each other. Rod 97 is bent upon itself so as to provide a looped portion 99, which looped portion passes over a wheel 100, whereby the upper part of the rod rests upon the grooved wheel 100 and the grooved wheel 100 guides the lower part. A suitable weight 101 is provided on rod 97 which holds the looped portion 99 properly in position and provides ample weight so that upon a back and forth movement of rod 99 there will be a sufficient friction to rotate wheel 100, which wheel is rigidly secured to shaft 102. Shaft 102 carries the pointer 103 arranged on the face of the dial 104. The dial 104 forms part of a casing 105, which casing carries drums 106 and 107. These drums are supported by suitable shafts 108 and 109, each shaft carrying a pinion 110 meshing with the respective racks 111 and 112. Racks 111 and 112 are connected with a reciprocating bar 113, which bar is provided with a notched portion 114 (Fig. 7) in which the end of arm 115 is positioned. Arm 115 surrounds shaft 102 loosely, but carries a reciprocating friction block 116, which block is pressed by spring 117. The spring 117 may have the tension thereof varied by a set screw 118 so as to cause a greater or less amount of friction of block 116 against shaft 102, and thereby provide a greater or less amount of power for shifting the reciprocating bar 113. A pair of pivotally mounted bars 119 and 120 are pivotally connected to bar 113 for preventing any momentum thereof. These bars carry at their upper ends adjustable weights so as to cause the same to act more evenly. Arranged in the cylinders 106 and 107 are suitable means which will be lighted up, as hereinafter fully described. These lights light up the cylinders when the car approaches a floor. These cylinders carry the legends "Up" and "Down" so that the passenger may see where the particular car is and the direction in which it is going, or is about to go.

Figures 15, 16, 17, 18, 19:
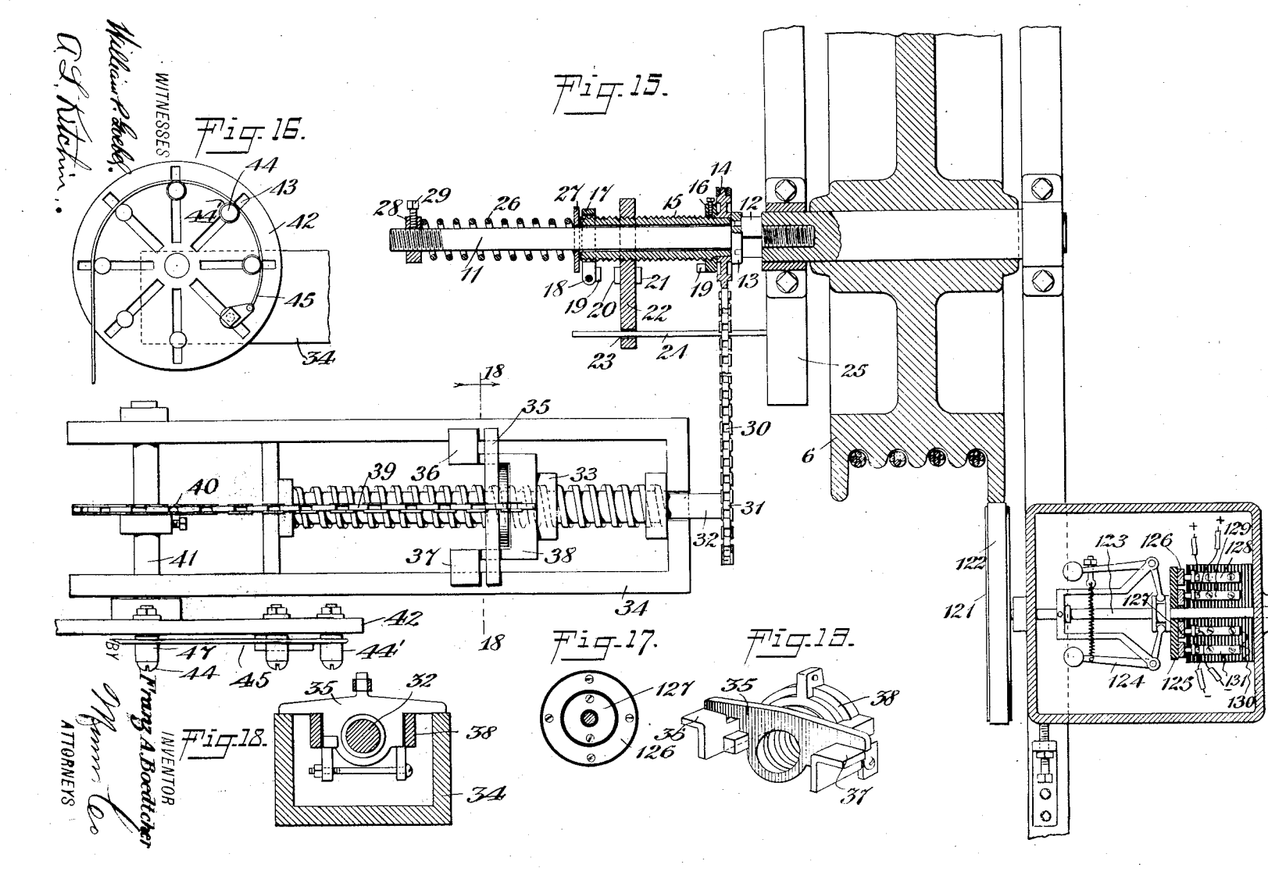
Fig. 15 is a fragmentary top plan view of the indicator rod or cable driving means, part of said means being shown in section.
Fig. 16 is a side elevation of the indicator rod or cable take-up.
Fig. 17 is a section through the switch controlling device shown in Fig. 15, the same being taken on line 17—17.
Fig. 18 is a section through Fig. 15 on line 18—18.
Fig. 19 is a detailed perspective view of a saddle or yoke embodying certain features of the invention.

In Figs. 15 and 17 will be disclosed a controlling device used for controlling the circuits of the release magnets 54 when an elevator passes a particular floor without stopping. When any of the buttons 49 have been depressed by a passenger, the switch mechanism shown in Figs. 8 to 10, inclusive, will operate for temporarily energizing magnet 54 and thus releasing the shutter 63 in that particular car, and also in all of the other cars. However, in case the car does not stop for the passenger ringing, the particular mechanism shown in Figs. 15 and 17 will maintain the circuit of all the magnets 54 open, whereby the shutter will remain in position and act as a signal that a passenger on a particular floor desires to go up or down, as the case may be. Referring more particularly to these figures, 121 indicates a wheel provided with a band or covering 122 which may be of leather or other suitable material so as to eliminate slipping between the same and the drum 6 against which it acts. As the drum rotates wheel 121 will be rotated which is provided with an axle 123. Connected with axle 123 is a governor 124 of substantially the usual centrifugal type. Connected with the governor 124 is an insulating plate 125 carrying rings 126 and 127. These rings are adapted to contact with members 128, 129, 130 and 131 through suitable members, as for instance set screws. These contact members are in the circuit of the magnets 54 of the two cars shown. Governor 124 is adjusted so as to hold the rings 126 and 127 out of contact with the members 128 to 131, inclusive, while the elevator is moving at substantially the usual speed, but when the elevator slows up for stopping at a floor the governor consequently slows up and allows these plates to contact with the respective contact members and thereby closes the circuit for the switches shown in Figs. 8 to 10, inclusive, whereby the same may be actuated to close the circuits of the magnets 54. It is of course evident that the governor 124 could be adjusted so as to allow the plates or rings 126 and 127 to contact with their respective contact members while the elevator is running at any speed without departing from the spirit of the invention.

By arranging the various parts above described a complete system is presented with co-acting parts which insure the correct working of the pointers on the various indicators, and also the correct working of the buttons and annunciators.

Figure 14:
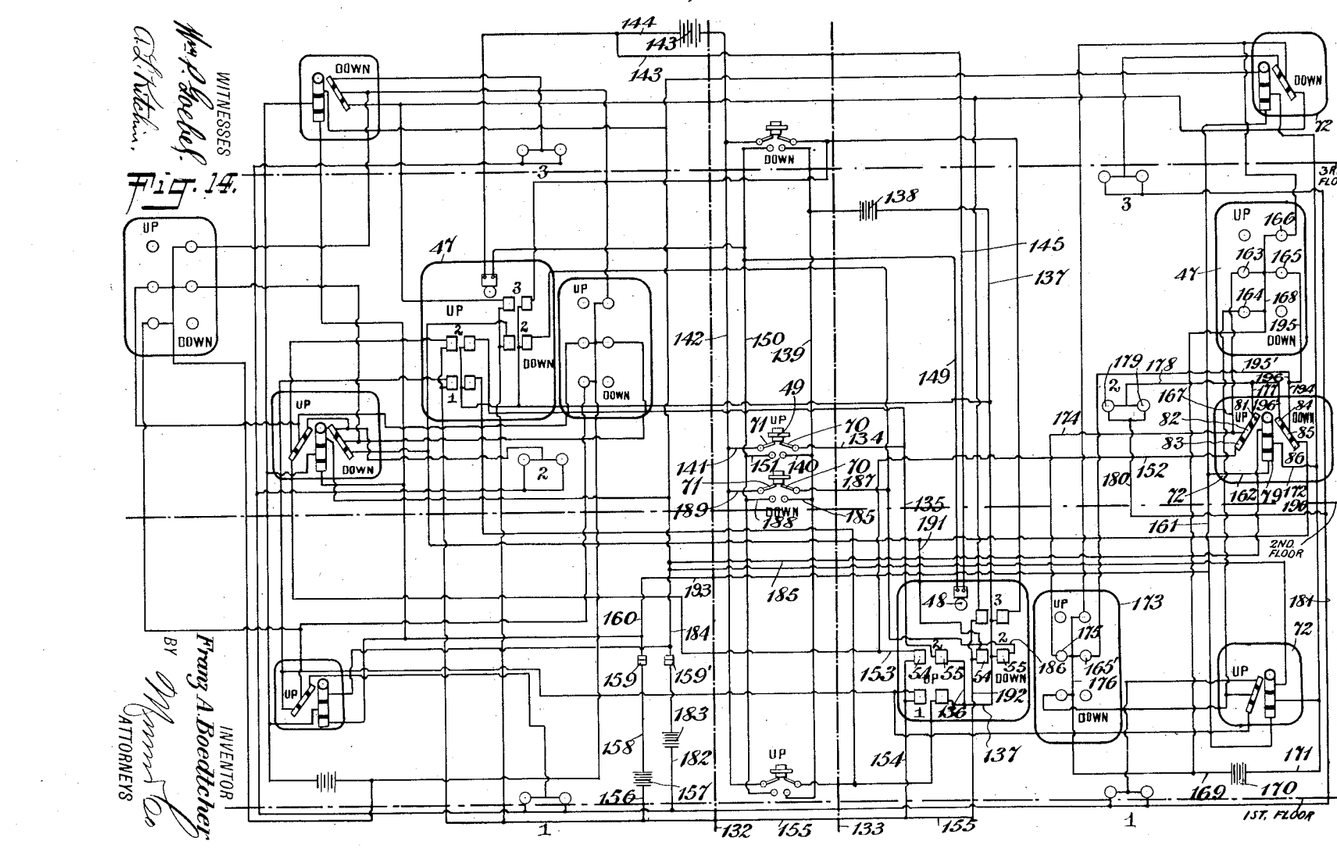
Fig. 14 is a diagram of the wirings for the annunciator, signal bells and associated devices.

The wiring for the buttons, annunciators and bells is shown in Fig. 14, to which reference is now made. The wiring in this diagram is arranged as near as possible to conform to the arrangement of the elevators, and as shown in Fig. 1, namely, the wiring for the buttons, *per se*, is arranged between lines 132 and 133, while the wiring for elevator 5 is arranged to the left of this line, and the wiring for elevator 4 is arranged to the right. The annunciator 47 in elevator 5 is represented by a suitable inclosing line while the annunciator 47 in elevator 4 is also represented by a suitable inclosing line.

Assuming that a passenger is on the second floor and desires to go up, the passenger presses button 49 on that floor, whereby the switches or contact members 70 and 71 are closed. When this occurs a bell 48 in each of the elevators rings and the annunciator 55 for the second floor on each of the annunciators 47 is operated, that is, the up magnet is operated, as shown in Fig. 2. Beginning with the contact 70 the current will flow through wire 134, wire 135, magnet 55, wire 136, wire 137 to battery 138, and from thence through wires 139 and 140 back to the contact 70. By closing this circuit temporarily magnet 55 will be energized temporarily and consequently throw up the shutter 63, as shown in Fig. 2. At the same time that this circuit is closed current will flow through the switch or contact 71 for ringing bell 48. Beginning with switch 71 current will flow through wire 141, wire 142, battery 143, wire 144, wire 145, bell 48, wire 149, and from thence through wires 150 and 151 to switch 71. From this it will be evident that the bell will ring as long as the button is depressed, and the magnet 55 will be energized as long as the button is depressed. When the button is released the bell will cease to operate, but the shutter 63 will be held in its elevated position by the locking bar or lever 61 shown in Fig. 3. When an elevator is moving upwardly and stops at the second floor for a passenger the same will close the circuit of all of the magnets 54 for the second floor. The switches shown in Figs. 8 to 9, inclusive, are shown in diagram in Fig. 14, in the housing 72 at the right of the figure. When the elevator moves upwardly to the second floor the arm 73 shown in Fig. 8 is moved over and member 80 is swung so as to cause the various sections of bar 79 to engage the respective contact members 81, 82 and 83. When these contact members are engaged current will flow, for instance, from contact member 83 through wire 152, wire 153, magnet 54 on each of the elevators, wire 154, wire 155, wire 156, battery 157, wire 158, rings 126 and 127 of the automatic switching device 159 shown in Fig. 15, wire 160, wire 193, wire 161, and wire 162 to one of the sections of bar 79, which contacts with the contact 83. This completes the circuit for magnet 54. At the same time that this circuit is closed the circuit is closed through lamp 163 arranged in the elevator for indicating to the operator and the passengers that the elevator is about to stop at a particular floor. The lamps 163, 164, 165 and 166 are arranged in a housing or casing similar to the annunciator, and are designed merely as visual signals which light up as the elevator is about to stop. Beginning with contact 82 current will pass therefrom to wire 167, lamp 163, wire 168, wire 169, battery 170, wire 171, and wire 172, back to the section of bar 79 opposite contact 82, whereupon the circuit of lamp 163 will be closed. From this it will be observed that when the button is pressed by a passenger the signal will immediately be given in the annunciator, and when the car is about to stop a light will flash in a suitable casing in the car. In addition to flashing a light in the car a light is flashed in casing 173 in the superintendent's office. Current passing to wire 167 from contact 82 will branch and pass through wire 174, lamp 175 in the superintendent's office, wire 176, wire 169, battery 170, wire 171, and from thence back to wire 172. In addition to providing these signals the drums 106 and 107 shown in Fig. 6 having the legends "Up" and "Down," will also be lighted so as to indicate to the passenger who has rung the bell that the car is about to stop. Starting with contact 81 current will flow through wire 177, wire 178, lamp 179, wire 180, wire 181, wire 182, battery 183, an automatic switch 159' shown in Fig. 15, wire 184, wire 185, back to member 79. Thus it will be seen that a large number of signals are lighted when the car is about to stop, and also that the annunciator will be automatically reset. In the showing in Fig. 14 there is a diagram for three floors so that the top and bottom floors are provided with only a half switch, that is, the top floor is provided with the contacts 84, 85 and 86 of the switch shown in Fig. 8, while the ground floor is provided only with contacts 81, 82 and 83. The contacts 81, 82 and 83 on the ground floor operate similar to those on the second floor and therefore will need no additional description. The contacts 84, 85 and 86 on the top floor operate similar to the same contact on the second floor which will be hereinafter fully described, as such description is thought to cover both floors. When a passenger is on the second floor and desires to go down the down button 49 is pressed, whereupon the circuit for bell 48 will be closed and the circuit for the magnet 55 on the down side of the annunciator will be closed. When the switch 70 of the down button is pressed current will flow through wire 185, wire 139, battery 138, wire 137, magnet 55 of the down side of the annunciator on the second floor, wire 186 and through wire 187 back to the switch 70. This will temporarily close the circuit of magnet 55 on the down side so as to raise the shutter 63. At the same time that current flows in this circuit current will flow through switch 71, wire 188, wire 150, wire 149, bell 48, wire 145, wire 144, battery 143, wire 142, and from thence through wire 189 to the switch 71. It will of course be evident that the bell 48 and the magnet 55 will be energized only as long as the button is depressed. The annunciator will continue to show the signal until one of the elevators has stopped to take on a passenger, but when the elevator stops contacts 84, 85 and 86 will engage the various sections of bar 79, which sections are insulated from each other. When the elevator stops to take on a passenger the governor closes the circuit of the annunciator so as to restore the same. It will be noted that an elevator passing down the elevator shaft will operate the bar 79 and will not cause the annunciator to be restored unless the elevator stops, as it requires the stopping of the elevator and consequently the stopping of the governor connected therewith before the circuit of the restoring mechanism of the annunciator is closed, as said circuit is through the contacts operated by the governor. This will close the circuits of the signal lamps in the car, the signal lamp in the superintendent's office and the signal lamps in the indicators at each floor.

A circuit for the contacts 84, 85 and 86 will now be traced to show how the same causes the various lights to operate and the release magnets to operate. Starting with contact 86 current will pass through wire 190, wire 191, magnet 54, wire 192, wire 155, wire 156, battery 157, wire 158, automatic switch 159, wire 160, wire 183, wire 161, and from thence through wire 162 to one of the sections of bar 79. This circuit will cause drop or shutter 63 to be restored or moved to the position shown in Fig. 4. Simultaneously with this action current will flow from contact 85 through wire 194, wire 195, lamp 165, wire 168, wire 169, battery 170, wire 171, and from thence through wire 172 to the center section of bar 79. This will cause the light in the car to light up, for indicating to the passengers that the car is about to stop. Simultaneously with this action current will divide at connection 196 and pass over wire 195' to lamp 165' and from thence through wire 176 to wire 169, battery 170, wire 171, wire 172, back to the starting point. Thus it will be seen that the contact 85 closes the circuit for the lamp 168 in the car and lamp 165 in the superintendent's office. At the time that these circuits are closed another circuit is closed, namely, the circuit which includes contact 84. Tracing this circuit and commencing with contact 84 current will flow through wire 196', wire 178, lamp 179, wire 180, wire 181, wire 182, battery 183, automatic switch 159, wire 184, wire 185, back to one of the sections of bar 79, thus completing the circuit. This circuit includes the lights which light up the indicator shown in Figs. 5, 6 and 7. Referring to Fig. 14, the circuit of the centrifugal governor 159 is shown as including the restoring magnets and also the switches at the restoring floor. In order that these switches may be more clearly understood, the same are hereby traced. Starting with battery 157 current will flow through wire 156, wire 155, wire 154, magnets 54, wire 153, wire 152 to contact 83 and from thence to contact 79, when the elevator is stopped on the second floor, wire 162, wire 161, wire 193, wire 160, governor 159, wire 158, back to battery 156. If the elevator should stop on the first or third floor the switches of said floors will be closed instead of the switch on the second floor as just described.

Each floor, except the top and bottom floors is formed with mechanism and wirings as described in respect to the second floor, the various parts merely being duplicated. In Fig. 14 the various circuits of one elevator on one floor have been traced so that the construction and operation of the various parts will be made clearly. The other floors and the other elevator are provided with the same structures and operate in the same way. In other words, the top switches and wiring and associated parts are the same for both elevators, and are arranged in multiple, the wirings on the second floor being arranged in multiple for the two floors and the bottom floor being likewise arranged in multiple with the same mechanism. By the wirings of the elevators being connected in multiple, the operation of any one push button will cause signals to be operated in all of the elevators. Also, it will be noted that any one elevator stopping at a floor will "clear" all of the elevators or annunciators in the respective elevators.

What I claim is—

1. In an elevator signal system of the class described, an indicator adapted to be arranged at each floor, an annunciator arranged in each of the elevators, a push button arranged on each floor, and means providing circuits for the push button, the annunciator and the indicators, said means including a system of wiring an elevator operated switch, and a stop switch operated by stopping the elevator at a floor, whereby when said push button is depressed the annunciators will be operated, and when an elevator stops at the floor upon which the button is located said stop switch will be operated for restoring said annunciator.

2. In an elevator signal system, a flash light signal arranged in each elevator, an annunciator arranged in each elevator, an indicator arranged on each floor, said indicator being provided with legends for indicating the direction of travel, means at each floor operable by a passenger for setting the annunciator in each of the elevators, and means operated by stopping the elevator to receive such passenger, said means closing the circuit of said flash light in the elevator and the circuit of the lights used in illuminating the legends in said indicators.

3. In an elevator signal system, a signal bell arranged in each elevator, a push button arranged on each floor, wiring for connecting said push buttons and said signal bells, whereby when said push buttons are pressed said bells will ring, an annunciator arranged in each of the elevators, wiring for connecting said annunciators with said push buttons, so that when any of said push buttons are pressed the corresponding part of the annunciator will be operated, means for restoring said annunciators, and means operated by the driving mechanism of the elevator for maintaining the circuit of said restoring mechanism open until the elevator stops, whereby an elevator passing a button that has been pressed will not reset said annunciators.

4. In an elevator signal system, an annunciator arranged in each of the elevators, a button at each floor, wiring connecting said buttons with said annunciators, whereby when the respective buttons are pressed the corresponding drops in the annunciators will be operated, a restoring mechanism for said annunciators, a circuit for said restoring mechanism including a switch operated by stopping the elevator, and means maintaining said restoring circuit open when the elevator passes a floor upon which a signal has been given, whereby said annunciator will not be restored.

5. In an elevator signal system, an annunciator in each elevator, a push button at each floor, wiring connecting said push buttons with annunciators in the respective elevators, whereby the annunciators may be operated from any floor, an elevator operated switch positioned at each floor, a second set of wiring for said elevator operated switch, a second switch operated by stopping the car, said second switch being included in said second set of wiring, whereby the annunciators are restored as the elevator stops at the floor on which the button, which has been pressed, is located.

6. In a signal device for elevators, an annunciator arranged in the elevator provided with a signal operating magnet and a signal resetting magnet, a push button arranged at each floor, a pair of circuits for said annunciator, one of said circuits including said push buttons, and said signal operating magnet, an elevator operated switch at each floor interposed in the circuit of said release magnet, said switch being closed as the elevator passes the floor on which it is located, and an automatic switch interposed in the circuit of the resetting magnet for maintaining said circuit open during the movement of the elevator, said automatic switch comprising a pair of contacts and a governor for moving one of said contacts toward and from the other contact.

In testimony whereof I have signed my name to this specification in the presence of two subscribing witnesses.

FRANZ A. BOEDTCHER.

Witnesses:
  A. L. KITCHIN,
  PHILIP D. ROLLHAUS.